United States Patent [19]

Hood

[11] Patent Number: 4,759,682
[45] Date of Patent: Jul. 26, 1988

[54] VEHICLE ENTRANCE RAMP
[75] Inventor: Delos W. Hood, Reno, Nev.
[73] Assignee: Transpec Inc., Troy, Mich.
[21] Appl. No.: 46,402
[22] Filed: May 6, 1987
[51] Int. Cl.⁴ ............................................. B65G 67/02
[52] U.S. Cl. ..................................... 414/537; 414/522;
 414/921; 280/166; 14/71.1; 74/424.8 A;
 105/433; 105/449
[58] Field of Search ............... 414/537, 538, 522, 921,
 414/541, 549, 558, 749; 280/166; 14/71.1, 71.3;
 74/424.8 A, 424.8 R, 89.15; 105/433, 449

[56] References Cited
U.S. PATENT DOCUMENTS 2,573,496 10/1951 Runkle ................................. 414/522
3,858,452 1/1975 Gatland et al. ............ 74/424.8 A X
4,131,209 12/1978 Manning ............................. 414/537
4,685,858 8/1987 Manning et al. .................... 414/537

FOREIGN PATENT DOCUMENTS 421433 12/1934 United Kingdom .......... 74/424.8 A

Primary Examiner—Frank E. Werner

[57] ABSTRACT

The present invention relates to an extendible and retractable ramp device for a vehicle particularly concerned with the loading and unloading of handicapped person and which device particularly includes a power actuating mechanism disposed within the vehicle in such a way as to protect the mechanism from damage, provide a ramp structure conducive to non-interferring ingress and egress by handicapped passengers and to incorporate a disconnect device which permits the ramp to be extended or retracted manually in the event power actuating mechanism becomes inoperative.

5 Claims, 6 Drawing Sheets

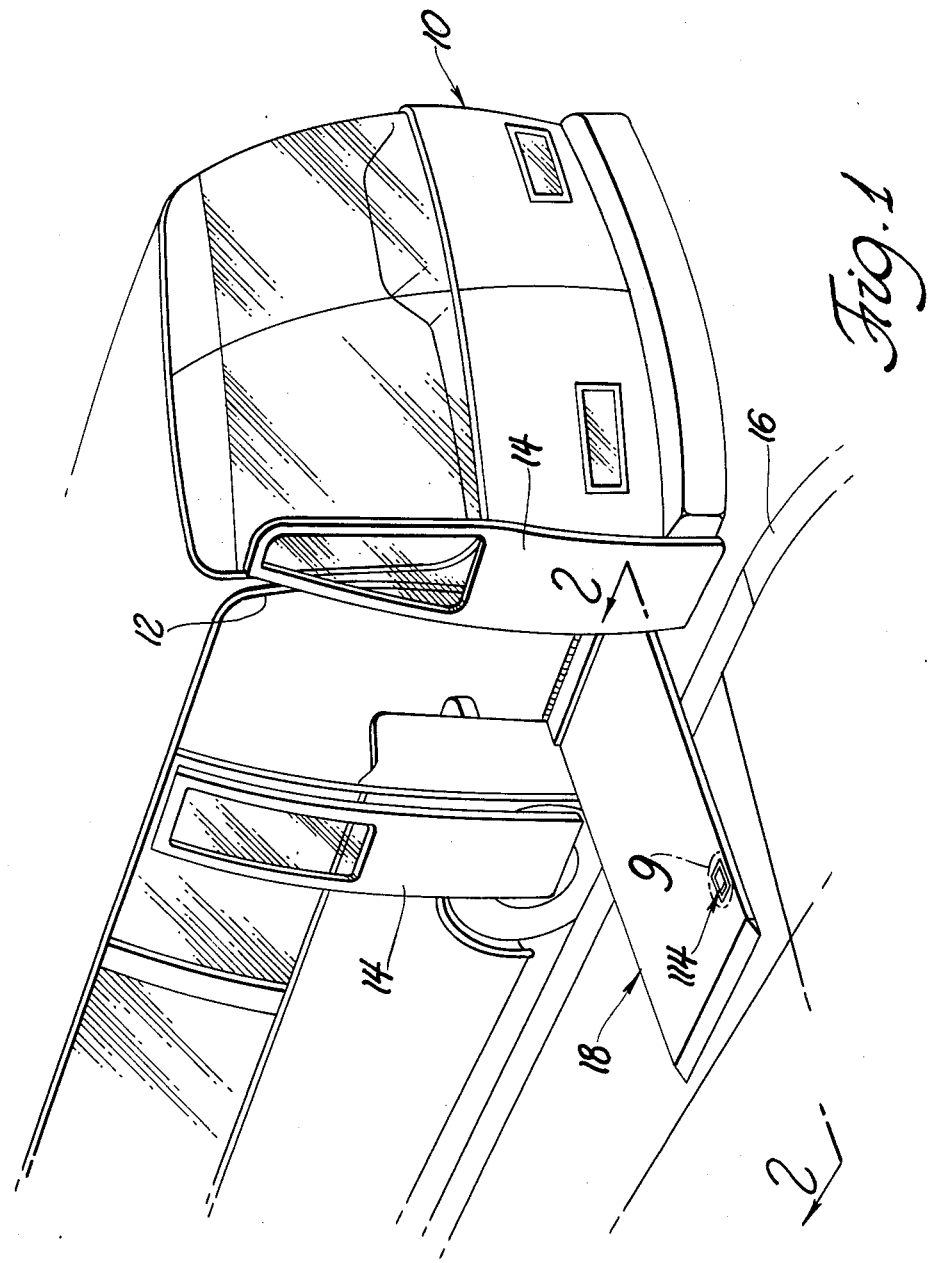

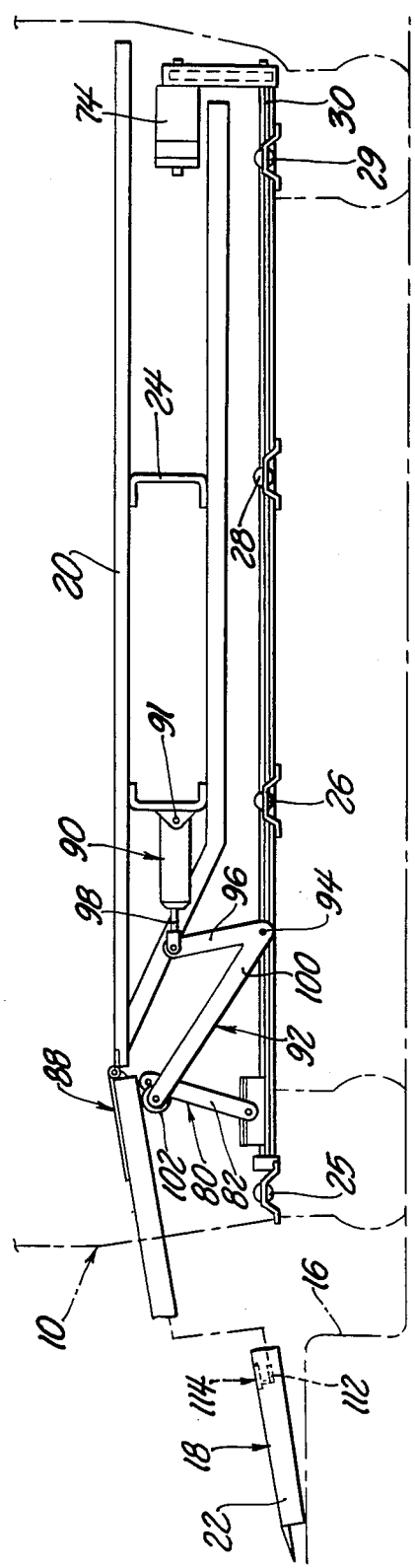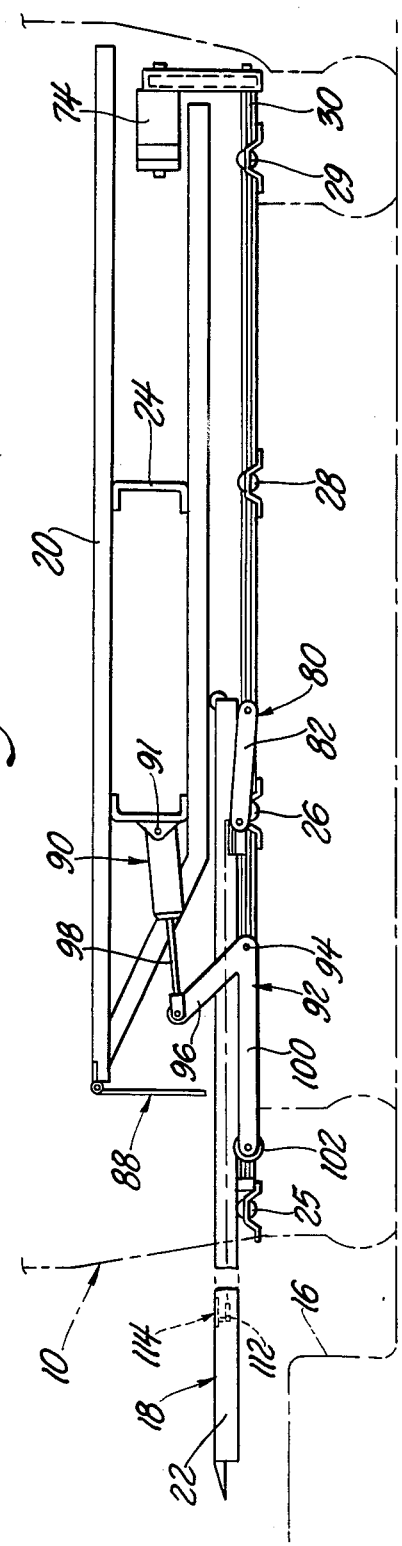

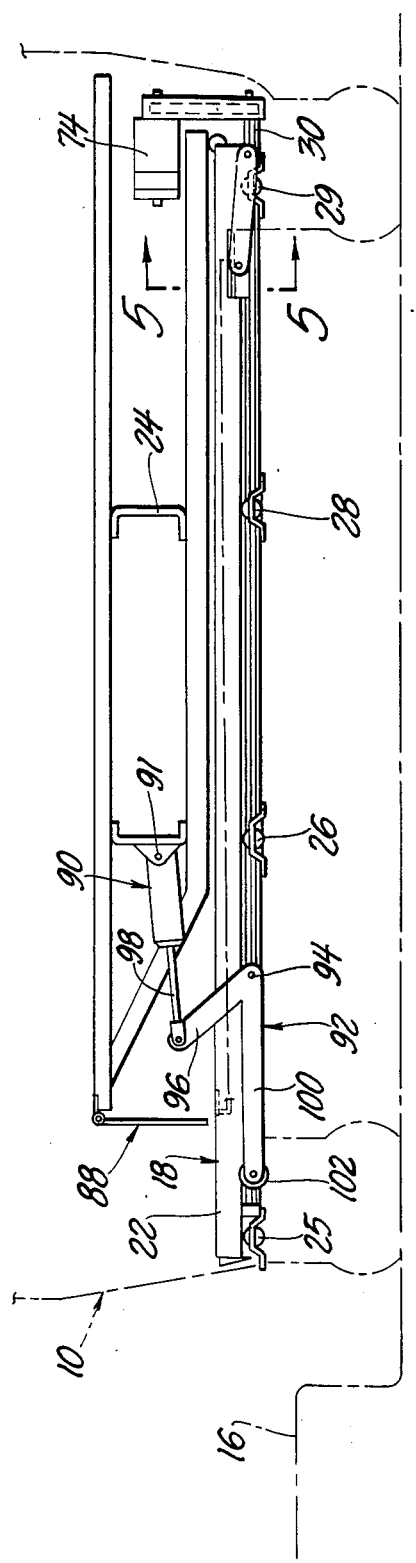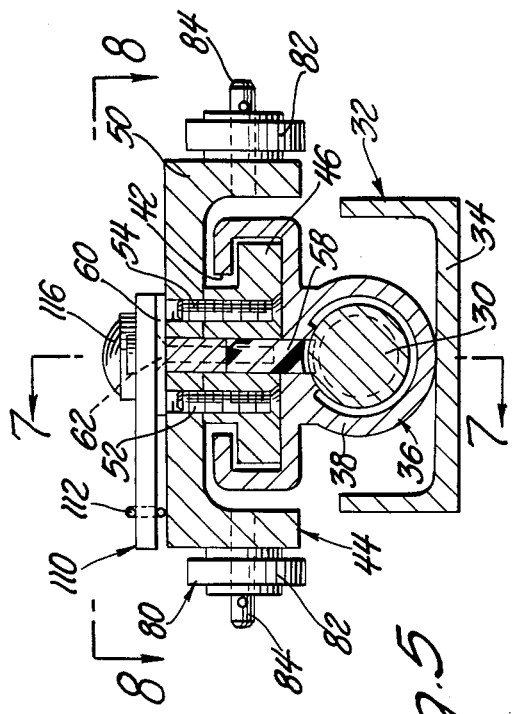

VEHICLE ENTRANCE RAMP

BACKGROUND OF THE INVENTION

The present invention relates to vehicle entranceways and exitways and, particularly, to stowable ramps associated therewith for facilitating the passage therethrough of wheelchairs and persons unable to negotiate one or more steps up into the vehicle.

There has long been a need for an extendible ramp at the entranceway of a motor bus, for example, over which a wheelchair passenger or other handicapped person might traverse in entering or leaving the vehicle at a bus stop. Several years ago, Donald L. Manning was granted U.S. Pat. No. 4,131,209 covering such an extendible ramp device. Mr. Manning and the inventor of the present device also filed a joint application Ser. No. 831,305 Vehicle Entrance Ramp on Feb. 20, 1986 now U.S. Pat. No. 4,685,858 as an improvement over Mr. Manning's earlier patent.

A potential problem exists with the earlier ramp devices in that a failure of the ramp actuating power mechanism could disable the ramp from being extended or retracted. It is apparent that if the ramp cannot be retracted the vehicle could not be driven. Likewise if the ramp could not be extended it could be difficult to disembark wheelchair passengers.

The present invention relates to a disconnect device which enables the ramp to be manually retracted or extended in the event the ramp actuating power mechanism becomes inoperative. More specifically, the device of the present invention disconnects the power driving mechanism from the ramp enabling the latter to be manually actuated.

Prior Art

The closest prior art of which I am aware are the already mentioned U.S. Pat. No. 4,131,209 Vehicle Entrance Ramp—Manning and pending application Ser. No. 831,305 filed Feb. 20, 1986 Vehicle Entrance Ramp—Hood and Manning.

The following patents were cited during the prosecution of the earlier Manning patent and patent application:

U.S. Pat. No. 1,717,303—Barclay
U.S. Pat. No. 2,573,496—Runkle
U.S. Pat. No. 2,797,104—Drobney et al
U.S. Pat. No. 3,730,361—Haynes
U.S. Pat. No. 4,022,337—Eichenhofer et al
U.S. Pat. No. 4,027,807—Thorley
U.S. Pat. No. 4,058,228—Hall
U.S. Pat. No. 4,133,437—Gates
U.S. Pat. No. 4,140,230—Pearson
U.S. Pat. No. 4,306,634—Sangster
U.S. Pat. No. 4,564,086—Kingston With the exception of Manning or Manning and Hood, none of the prior art references relates to a power actuated ramp. Drobney et al, Hall, Gates, Pearson, Sangster, Kingston, Eichenhofer and Thorley relate to power actuated steps or lifts and the related devices could not be negotiated by a wheelchair or traversed by any person who could not handle one or more steps.

SUMMARY OF THE INVENTION

It is among the principle objects of our invention to provide a power operated ramp to facilitate wheelchair passengers and the like in entering and leaving a vehicle, such as a motor bus; provide such a ramp which is normally stowed below the vehicle floor adjacent an entranceway to the vehicle and, when extended, moves outwardly through the entranceway and automatically tilts upwardly towards its inner end to provide a rigid inclined platform leading to the sidewalk or roadway exteriorly of the vehicle; to provide such a ramp whose extendible end portion is spaced below the vehicle floor to serve as a step for other persons entering the vehicle when the ramp is in its stowed position; to provide such a ramp including a normally vertical step riser in the vehicle entranceway which swings upwardly about the adjacent edge of the vehicle floor to cover the innermost end portion of the ramp when the latter is in its fully extended position; to provide a ramp actuating mechanism which is separate from the ramp and remains entirely inside the vehicle whereby such mechanism is prevented from being damaged or interfering with the use of the ramp by a handicapped passenger; and to provide a device for disconnecting the ramp from its power actuating mechanism so as to enable the ramp to be manually extended or retracted in the event the power mechanism becomes inoperative.

The means by which the above-stated objects and advantages of our invention are realized will be clearly understood from the following description of a preferred embodiment thereof selected for the purposes of illustration, having reference to the drawings, wherein:

BRIEF DESCRIPTION OF THE DRAWINGS

FIG. 1 is a perspective view of a motor bus having a side entranceway with our improved ramp in its fully extended position and at rest on a sidewalk.

FIGS. 2, 3 and 4 are transverse views of a bus showing the ramp and associated operating mechanism in a fully extended position, a partially extended position and a fully retracted position.

FIG. 5 is a cross sectional view of the ramp driving mechanism taken along line 5—5 of FIG. 4.

DESCRIPTION OF THE PREFERRED EMBODIMENT

Figure 6:
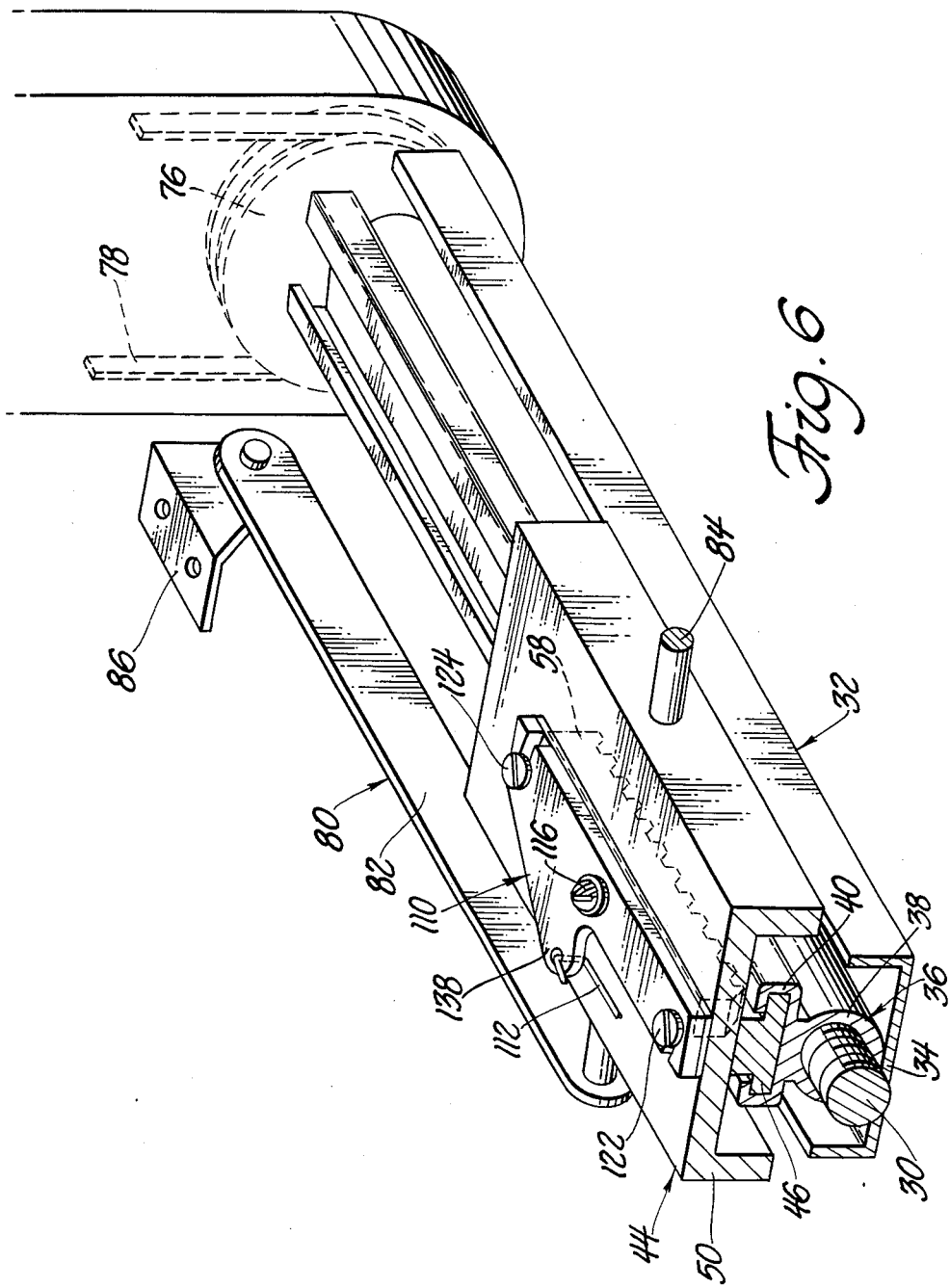
FIG. 6 is a partially sectioned perspective view of the ramp driving mechanism.

As best seen by reference to FIGS. 1 through 4, a motor bus is indicated generally at 10 and includes a front passenger opening 12 generally opposite the driver's position and adapted to be closed by doors 14. In these views the bus is shown parked next to a curb and sidewalk area indicated at 16. An extendible ramp is indicated generally at 18 and is shown in FIGS. 1 and 2 in its fully extended position ready to receive a wheelchair or handicapped person.

Referring specifically to FIG. 4, ramp 18 is shown in its fully retracted position beneath the vehicle floor 20. In this position, the outer most portion 22 of the ramp 18 is disposed within the front door entrance well and forms a step for normal movement into and out of the bus under conditions in which the use of the ramp is unnecessary.

The bus includes a suitable subframe structure indicated generally at 24 which supports the bus flooring and also supports and houses the ramp and its operating mechanism.

The ramp and its operating mechanism will now be described in detail with particular reference to FIGS. 2 through 7. When the ramp is in its fully and partially stored positions beneath the vehicle floor, it is supported adjacent its laterally outer edges upon sets of roller devices 25, 26, 28 and 29 which are, in turn, suitably mounted upon part of the vehicle subframe structure 24. A ramp driving screw is indicated at 30 and is supported for rotation within a housing indicated generally at 32 and which housing is, in turn, fixedly supported to the bus subframe 24. Housing 32 is best seen by reference to FIGS. 5, 6 and 7 and includes an upwardly opening, U-shaped channel 34 to which a drive screw supporting casing 36 is suitably fixed as by welding at its lower portion. The casing 36 includes a tubular portion 38 within which drive screw 30 is rotatably supported. The upper side of casing 36 includes an upwardly opening channel portion 40 having a longitudinally extending slot 42.

A traversing bracket member 44 includes inner guide elements 46 and 48 disposed within said channel portion 40 and slot 42. Bracket 44 includes a downwardly opening U-shaped channel member 50 to the underside of which guide elements 46 and 48 are fixed. Guide elements 46 and 48 are suitably fixed to the U-shaped member 50 through screw members 52 and 54. The T-shaped guide elements 46 and 48 are longitudinally spaced relative to the bracket channel 50 so as to define an intermediate cavity 56 within which a rack member 58 is vertically slidably supported so as to project through a corresponding opening 60 in the tubular member 38 to engage with the threaded drive screw member 30.

Rack member 58 is secured to a plate element 60 by screw member 62 and 64. A spacer 66 is disposed between rack member 58 and plate 60.

The inner most end of drive screw 30 is drivably connected to an electric motor 74 through a suitable mechanism such as a pulley 76 and a belt 78. When motor 74 is energized to rotate screw 30, rack 58 is driven rearwardly or forwardly carrying with it bracket 44.

The moveable bracket 44 is interconnected with the innermost end of ramp 18 through a linkage mechanism indicated generally at 80. Linkage mechanism 80 includes a pair of levers 82 pivotally connected on either side of the bracket respectively through pin members 84. The other ends of levers 82 are connected through suitable brackets 86 to the innermost end of the ramp 18. As viewed in FIG. 4, as motor 74 is energized to extend ramp 18 to its outer most position, drive screw 30 is rotated and drives bracket 44 to the left and, in so doing, causes the levers 82 to impart a corresponding leftward movement to the ramp.

A step riser is indicated generally at 88 and is hingedly secured to the bus floor 20 adjacent the step well. As the innermost end of ramp 18 approaches riser 88 a suitable switch, not shown, is actuated to energize a power piston or solenoid device indicated at 90 pivotally connected to subframe 24 at 91. A bell crank 82 is pivotally supported at 94 to a portion of the floor substructure 24 and includes a first arm 96 pivotally connected to rod 98 of actuator 90 causing the bell crank to be rotated clockwise when the actuator is energized. The other arm 100 of bell crank 82 includes a roller 102 at its outer end and which roller is adapted to engage ramp 18. As best seen in FIG. 2, when actuator 90 is energized to rotate the bell crank in a clockwise direction, the inner most end of ramp 18 is elevated to bring said end into alignment with the bus floor 20 and, in so doing, also rotates the pivotal riser 88 to provide a smooth transition area between the ramp and the bus floor. When the driver wishes to retract the ramp, actuator 90 is de-energized causing the bell crank lever 92 to move in a counterclockwise direction and lowering the inner end of the ramp to a generally horizontal position after which motor 74 is again energized to move bracket 44 to the right and thereby retract ramp 18 beneath the vehicle floor.

With the aforedescribed arrangement, the ramp 18 is formed of an uninterrupted surface to provide an entirely smooth area for the ingress or egress of wheelchairs or handicapped people. At the same time, the ramp actuating motor and drive screw are disposed beneath the vehicle floor in a protected environment in a way as to minimize damage thereto.

As best seen in FIGS. 5, 6, 7 and 8, a disconnect device includes a lever 110, a cable 112 and an operating handle 114. Lever 110 is pivotally mounted on traveller 44 through a pin 116 threaded into spacer 66. Lever 110 includes a pair of oppositely opening slots 118 and 120. A pair of studs 122 and 124 include threaded portion 126 and 128 respectively threadably connected to guide elements 46 and 48.

Figure 7:
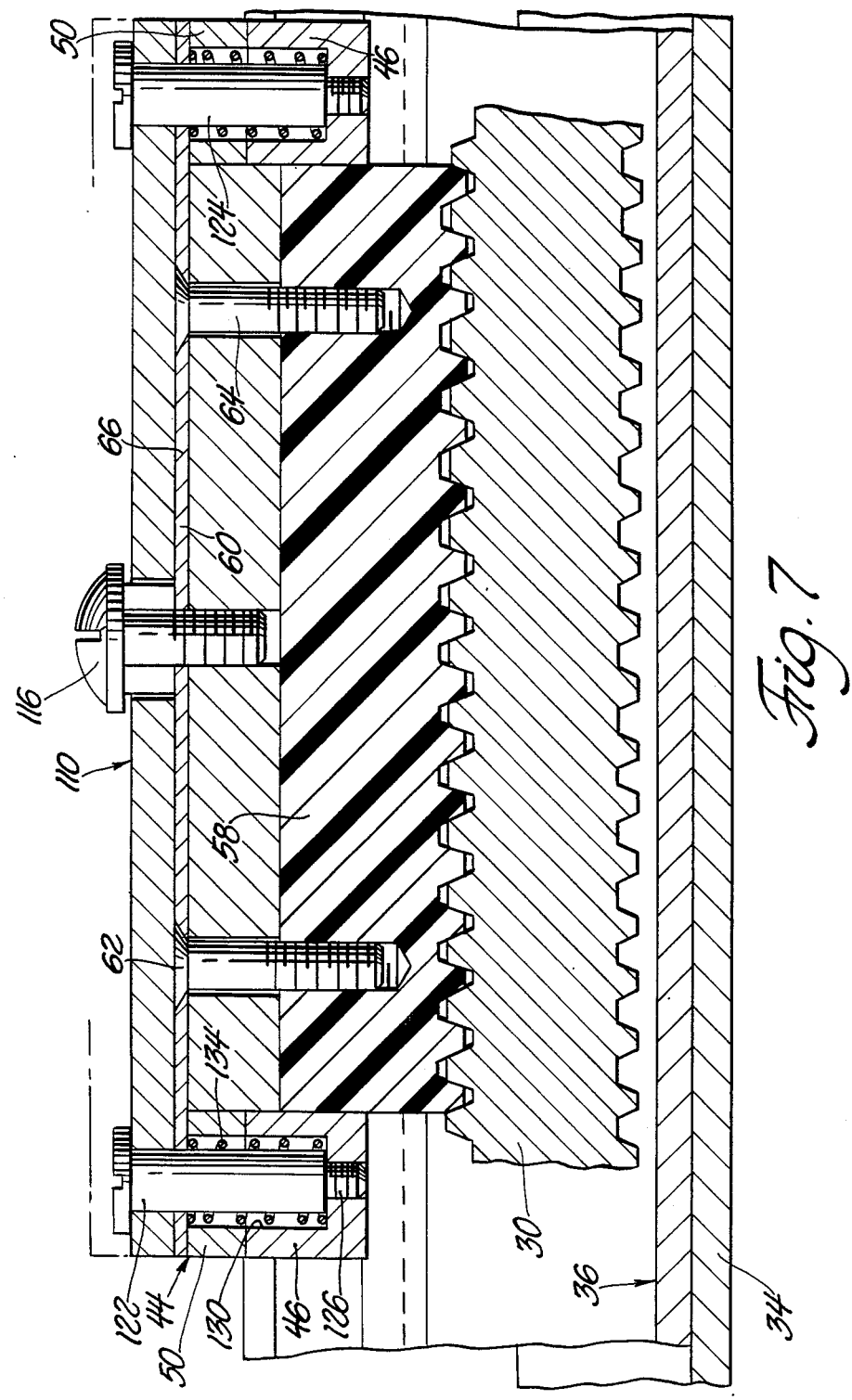
FIG. 7 is a view along line 7—7 of FIG. 5.
Figure 8:
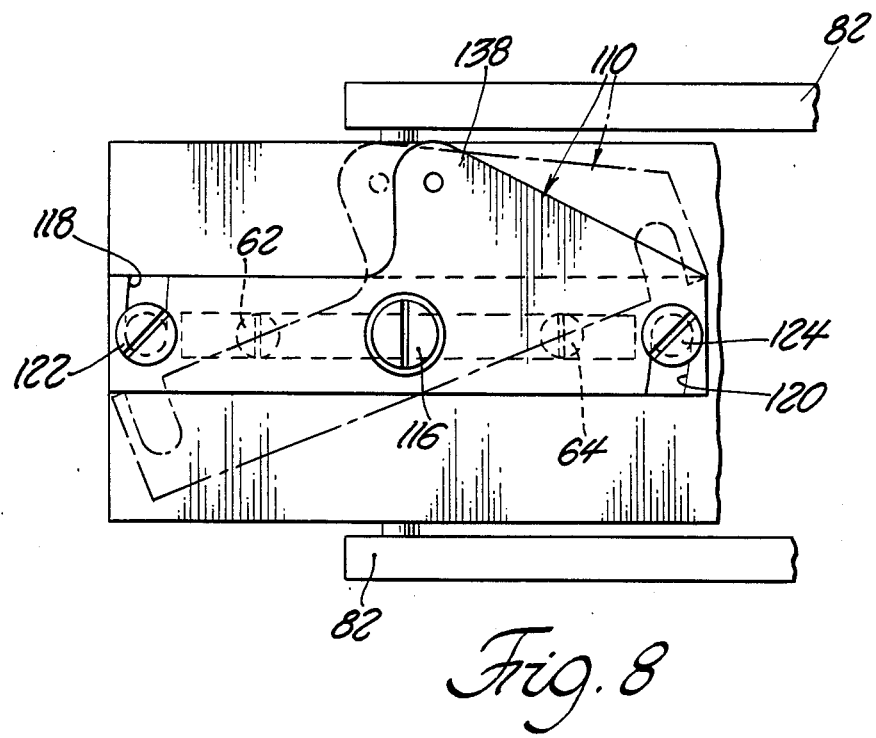
FIG. 8 is a plan view along line 8—8 of FIG. 5.

Guide elements 46 and 48 respectively include enlarged bores 130 and 132 within which coil springs 134 and 136 are respectively disposed and maintained in compression when lever 11 is in its normal or connected position as shown in FIGS. 6, 7 and 8.

Figure 9:
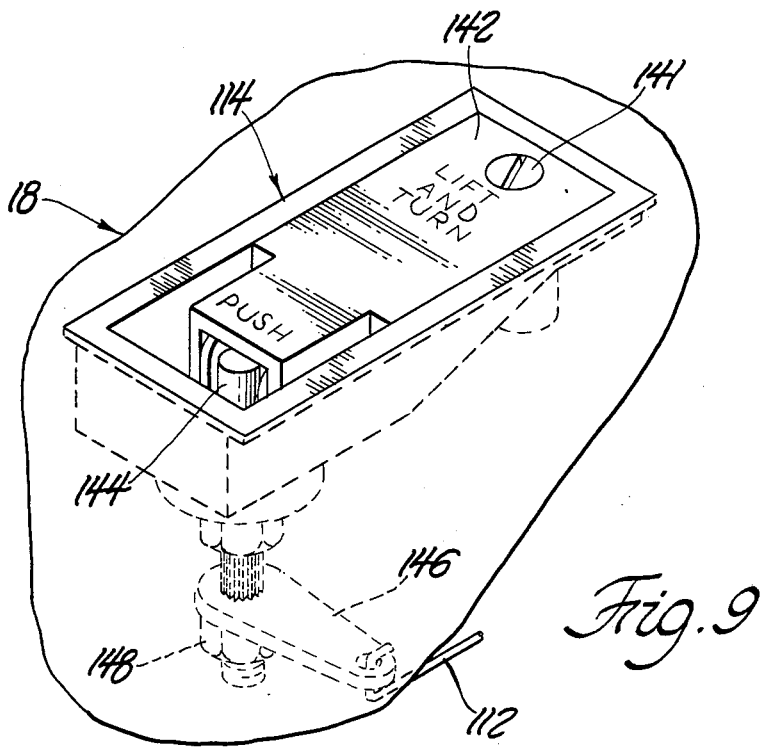
FIG. 9 is an enlarged view of the ramp-located disconnect operating handle also shown in FIG. 1.

Lever 110 includes a laterally offset portion 138 to which the inner end of cable 112 is attached. The other end of cable 112 is connected to operating handle 114. An enlarged view of handle 114 is shown in FIG. 9 and includes a casing 140 recessed into the upper surface of ramp 18. A handle tab 142 is pivotally connected to the upper end of a shaft 144 rotatably supported within casing 140. Shaft 144 extends through and projects beyond the bottom surface of ramp 18. A lever 146 is suitably fixed, as by nut 148, to the lower end of shaft 144. The outer end of cable 112 is fixed to shaft lever 146. In its normal or inoperative position, tab is pivoted to its horizontal position so as to be recessed within casing 140 as shown in FIG. 9.

As best seen in FIGS. 1 and 4, operating handle 114 is mounted toward the out end of ramp 18. Preferably and as best seen in FIG. 4, operating handle 114 is located so as to be laterally inside of the pivotal riser 88 when the ramp is in its fully retracted position so that the handle is in a position where it is less likely to be damaged. It is obvious that the riser 88 may be lifted to gain access to operating handle 114.

OPERATION OF DISCONNECT DEVICE

For purposes of illustration, it will be assumed that the ramp-actuating power system becomes inoperative when ramp 18 is in its fully extended position as shown in FIGS. 1 and 2. In such case it becomes necessary to retract ramp 18 before the bus can be driven.

Referring to FIG. 9, the first step is to rotate hold down screw 141 to unlock handle tab 142 the inner end of which is pushed down thereby causing the outer end of the tab to lift to a generally vertical or upright position. Next, tab 142 is rotated in a clockwise direction which causes a similar rotation of shaft 144 and lever 146. The rotation imparts a leftward movement of cable 112.

As best seen in FIGS. 5 through 8, leftward movement of cable 112 causes a counterclockwise rotation of disconnect lever 110. As seen in the dash lines of FIG. 8, counterclockwise movement of lever 110 moves the latter from beneath the heads of studs 122 and 124. Once lever 110 is free of studs 122 and 124, springs 134 and 136 bias plate 60 upwardly until it abuts against the underside of the heads of studs 122 and 124. Such upward movement lifts rack member 58 out of driving engagement with screw 30 thereby disconnecting the power driving mechanism from ramp 18. As already noted, when actuator 90 is de-energized, as by shutting off the electric power, the bell crank lever 92 will move in a counterclockwise direction to lower the inner end of ramp 18. Thus, with the power mechanism disconnected from the ramp and the inner end of the latter lowered, the ramp can be manually pushed to a retracted position enabling the bus to be driven.

When it is desired to reconnect the power mechanism to the ramp plate 60 and lever 110 are depressed against the force of springs 134 and 136 and lever 110 is rotated in a clockwise direction whereby the lever is once again disposed beneath and vertically restrained by the heads of studs 122 and 124. In this position rack member 58 is once again threadably connected to drive screw 30. It is necessary to perform the reconnecting operation with ramp 18 in its fully extended position because the ramp can be lifted to give manual access to disconnect lever 110 for both rotation and depression.

It will be appreciated that various minor changes in the parts or their arrangement may be made without departing from the scope of the inventions as herein after claimed.

What is claimed is:

1. A vehicular passenger boarding system of the type including a door opening (12), a floor (20) within the vehicle, a ramp member (18) storable beneath said floor, a mechanism for moving said ramp laterally of the vehicle so as to extend through the door opening in such a way that the ramp's outer end can rest on the ground, said mechanism including a motor (74), a screw member (30) drivingly connected to said motor, a first device (44) including a threaded element (58) coacting with the screw member and operatively connected to the ramp member (18), rotation of the motor driven screw member causing the threaded means to move the ramp transversely of the vehicle, said mechanism including means (90-102) for lifting the inner end of said ramp to the vehicle floor level when the ramp is in its fully laterally extended position whereby a passenger may enter or leave the vehicle by traversing said ramp without the impediment of a step, the improvement in said mechanism wherein:
  A. said first device (44) includes a bracket assembly (46–50), said threaded element (58) being slidable in said bracket assembly normal to the rotative axis of the screw member (30);
  B. a second device (110, 112 and 114) for disconnecting the operative connection between the first device (44) and the screw member (30) whereby the ramp member (18) can be moved transversely of the vehicle independently of said power actuated screw member, said second device including an element (110) rotatably connected to and movable with the threaded element (58);
  C. locking means (122–124) for releasably retaining the second device element (110) to said bracket assembly;
  D. spring means (134–136) disposed between said first and second devices and adapted to lift the element (110) relative to the bracket assembly and thereby to move the threaded element (58) out of engagement with screw member (30) when the element (110) is disconnected from said locking means by operating means on the ramp.

2. A vehicular passenger boarding system of the type set forth in claim 1 wherein:
  A. said second device includes a plate element (110) rotatably secured to said threaded element (58) and supported upon the bracket assembly (46–50), said plate element having laterally spaced slotted portions;
  B. said locking means comprises a pair of stud members (122–124) secured to and having head portions projecting above said bracket assembly, the head portions of said stud members respectively coacting with the slotted portions of the plate element (110) to retain the plate element in abutting relation with the bracket assembly and the threaded element (58) in driving engagement with the screw member (30).

3. A vehicular passenger boarding system of the type set forth in claim 2 wherein:
  A. a second plate (60) fixed to the threaded element (58) and disposed immediately subadjacent the first plate element (110) said second plate extending laterally beneath the heads of the stud members (122 and 124);
  B. said spring means (134 and 136) biasing said second plate toward the stud heads whereby when the first plate (110) is rotated out of engagement with the stud members the second plate is lifted into abutting engagement with the stud heads to thereby drivingly disconnect the threaded element (58) from the screw member (30).

4. A vehicular passenger boarding system of the type set forth in claim 2 wherein said second device operating means comprises a cable (112) connected at its respective ends to said plate element (110) and an actuating handle (114), said handle being recessed in said ramp member (18) proximate the outer portion thereof whereby actuation of said handle will cause the cable to rotate the plate (110) to disconnect the operative connection between the power actuated screw (30) and the ramp (18).

5. A vehicular passenger boarding system of the type set forth in claim 3 wherein said stud members (122 and 124) are detachably secured to said bracket assembly whereby detachment of the stud members allows said second device and said threaded element (58) to be removed from said first device (44).

* * * * *